US008534707B2

(12) United States Patent
Herlin et al.

(10) Patent No.: US 8,534,707 B2
(45) Date of Patent: Sep. 17, 2013

(54) INFORMATION PAGE

(75) Inventors: Jari Herlin, Helsinki (FI); Maila Korhonen, Vantaa (FI); Teemu Pohjola, Espoo (FI); Taru Syrjänen, Vantaa (FI); Mika Holmberg, Helsinki (FI)

(73) Assignee: Setec Oy, Vantaa (FI)

( * ) Notice: Subject to any disclaimer, the term of this patent is extended or adjusted under 35 U.S.C. 154(b) by 697 days.

(21) Appl. No.: 12/093,079

(22) PCT Filed: Nov. 7, 2006

(86) PCT No.: PCT/FI2006/050480

§ 371 (c)(1),
(2), (4) Date: Aug. 7, 2008

(87) PCT Pub. No.: WO2007/054618

PCT Pub. Date: May 18, 2007

(65) Prior Publication Data

US 2008/0309064 A1 Dec. 18, 2008

(30) Foreign Application Priority Data

Nov. 8, 2005 (FI) ..................................... 20055596

(51) Int. Cl.

| | |
|---|---|
| ***B42D 1/00*** | (2006.01) |
| ***B42D 19/00*** | (2006.01) |
| ***B42D 5/00*** | (2006.01) |
| ***B42D 3/00*** | (2006.01) |
| ***B42D 15/00*** | (2006.01) |
| ***G09C 3/00*** | (2006.01) |
| ***B42C 9/00*** | (2006.01) |
| ***B42C 11/00*** | (2006.01) |
| ***B42C 11/04*** | (2006.01) |
| ***B42C 5/02*** | (2006.01) |

(52) U.S. Cl.
USPC ........... 281/12; 281/2; 281/3.1; 281/5; 281/7; 281/9; 281/10; 281/14; 281/15.1; 281/21.1; 281/23; 281/27; 281/29; 281/38; 283/63.1; 283/67; 283/70; 283/72; 283/74; 283/75; 283/77; 412/1; 412/4; 412/6; 412/8; 412/21; 412/30

(58) Field of Classification Search
USPC ............... 281/2, 3.1, 5, 7, 9, 10, 12, 14, 15.1, 281/21.1, 23, 27, 29, 38, 51; 283/63.1, 67, 283/70, 72, 74, 75, 77, 117; 412/1, 4, 6, 412/8, 21, 30
See application file for complete search history.

(56) References Cited

U.S. PATENT DOCUMENTS 6,135,503 A * 10/2000 Lob et al. ..................... 283/63.1
6,213,702 B1 * 4/2001 Wesselink .................... 281/21.1

(Continued)

FOREIGN PATENT DOCUMENTS

EP 1 008 459 A1 6/2000
EP 1 502 765 A1 2/2005

(Continued)

OTHER PUBLICATIONS

EP Supplemental Search Report issued on Mar. 2, 2011 in EP Application No. 06 80 8021.

*Primary Examiner* — Dana Ross
*Assistant Examiner* — Justin V Lewis
(74) *Attorney, Agent, or Firm* — Panitch Schwarze Belisario & Nadel LLP

(57) ABSTRACT

An information page (1) of a security document, includes: an information part (3), on the upper or lower surface of which part of the information recorded on the information page (1) can be seen; and a flexible connecting part (2) with good bending strength for attaching the information page (1) to a security document. To ensure that detaching the information part and the connecting part from each other leaves visible marks, the connecting part (2) has a netlike structure, and the connecting part (2) is arranged to penetrate into the information part (3) in the immediate vicinity of the upper or lower surface of the information part.

8 Claims, 2 Drawing Sheets

(56) References Cited

U.S. PATENT DOCUMENTS

| | | | | |
|---|---|---|---|---|
| 7,040,981 | B2 * | 5/2006 | Iliescu et al. | 412/6 |
| 2005/0248147 | A1 * | 11/2005 | Staub et al. | 283/72 |
| 2008/0284155 | A1 * | 11/2008 | Christen et al. | 283/63.1 |

FOREIGN PATENT DOCUMENTS

| | | | |
|---|---|---|---|
| EP | 1 574 359 | A2 | 9/2005 |
| WO | 2004/110780 | A1 | 12/2004 |
| WO | 2006053738 | A2 | 5/2006 |

* cited by examiner

INFORMATION PAGE

CROSS-REFERENCE TO RELATED APPLICATION

This application is a Section 371 of International Application No. PCT/FI2006/050480, filed Nov. 7, 2006, which was published in the English language on May 18, 2007, under International Publication No. WO 2007/054618 A1, and the disclosure of which is incorporated herein by reference.

FIELD OF THE INVENTION

The invention relates to an information page of a security document, such as a passport. The invention particularly relates to a solution with which it can be ensured that visible marks are left on an information page if there have been attempts to change its information part.

DESCRIPTION OF PRIOR ART

Requirements for the properties of an information page of a security document are partly conflicting. Firstly, the information part of an information page, in which information of the information page is recorded, must have such a structure that a forger cannot disassemble it. Further, one prerequisite is that at least part of the information of the information page can be recorded on the information page by means of laser engraving. To achieve these aims, the information part must, in practice, be manufactured of material having poor bending properties and bending strength.

However, good bending properties and bending strength are expected of an information page in order for it to be attached to a security document in a way corresponding to that used for other pages of the document. Thus, there is a need to attach a flexible connecting part with good bending strength to the information part, via which the information page is joined to the security document. To achieve sufficient safety level, the information part of the information page must be joined to the connecting part in such a way that detaching these two from each other is not possible without there being visible marks.

SUMMARY OF THE INVENTION

An object of this invention is to provide a solution that makes it difficult to detach the information part and the connecting part of an information page from each other without there being visible marks. This object is achieved with an information page according to the following description and attached drawings and a method according to the following description and attached drawings.

The invention utilizes a connecting part having a netlike structure. If a forger attempts to detach such a connecting part from the information part by cutting and subsequently attaches another information part to the original connecting part, this requires that individual threads of the netlike connecting part be attached to this new information part. Attaching individual threads like this without there being visible marks is very difficult in practice.

In the invention, the connecting part having a netlike structure is arranged to penetrate into the information part in the immediate vicinity of the upper or lower surface of the information part. Thus, visible marks are left on the upper or lower surface of the information part if the forger attempts to cut an incision in the material of the information part in order to detach the information part and the connecting part from each other.

Preferred embodiments of the information part and method according to the invention become apparent from the following description and attached drawings.

BRIEF DESCRIPTION OF THE DRAWINGS

The invention will now be described by way of example by referring, in greater detail, to the attached figures, of which.

DESCRIPTION OF AT LEAST ONE EMBODIMENT

Figure 1:
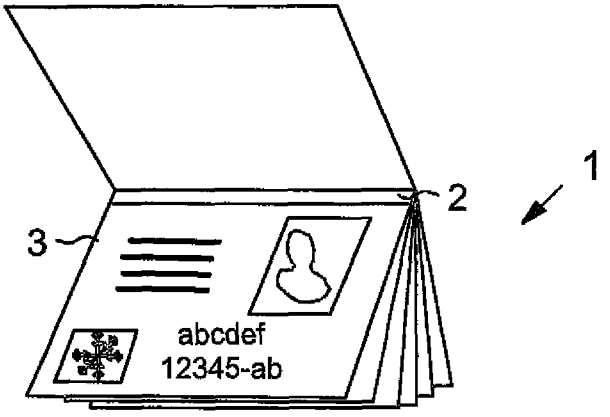
FIG. 1 shows an information page attached to a security document.

FIG. 1 shows an information page 1 attached to a security document. In the example of FIG. 1, the security document is a passport, to which the information page 1 is attached via a connecting part 2. The information page 1 can be attached to a security document for instance via a stitch, for example, in other words in a way corresponding to that used for the other pages of the security document.

In the information area of the upper surface of the information part 3 of the information page, the individualized information of the information page can be seen, for instance the passport owner's name, time of birth, photograph etc. Part of the information may be recorded for example by using laser engraving technology and part by using printing ink.

Figure 2:
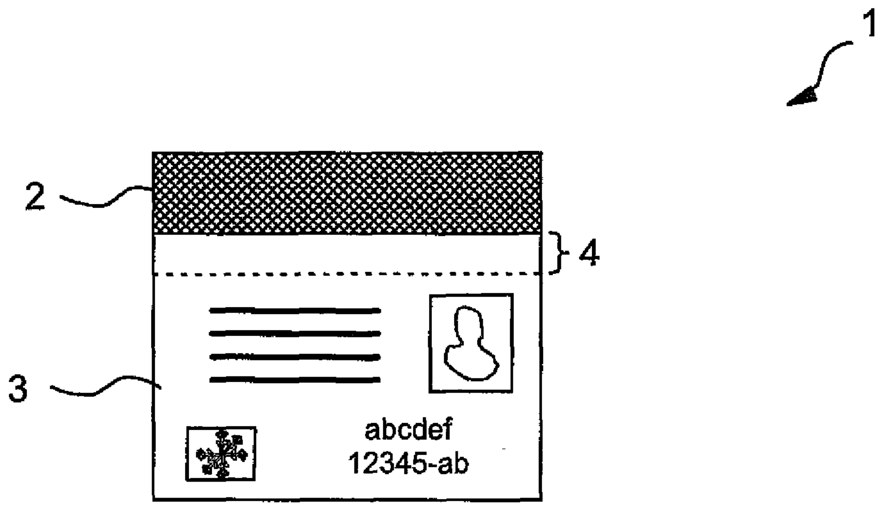
FIG. 2 shows a first preferred embodiment of the information page according to the invention.

FIG. 2 shows a first preferred embodiment of the information page according to the invention. The information page 1 of FIG. 2 comprises a connecting part 2 with a netlike structure. The netlike structure may be formed of texture comprising individual intersecting threads that may each be formed of several filaments. Alternatively, the netlike structure may be provided in such a way that a uniform film is perforated to achieve a desired pattern. What is essential to the invention is that the network has a sufficient number of individual "threads", the attaching of which to each other without visible marks in connection with attempted forgery becomes as difficult as possible.

The connecting part 2 is arranged to penetrate into the information part 3 in such a way that a seam 4, which is illustrated in FIG. 2, is formed between these two. In the area of the seam, the information part 3 and the connecting part 2 are attached to each other, preferably by laminating. In accordance with the invention, the connecting part 2 penetrates into the information part 3 in the immediate vicinity of the upper or lower surface of the information part. Then, if the forger tries to break the seam 4 by cutting in order to detach the information part 3 from the connecting part, there will be visible marks on the surface of the information part 3. Also in attempted forgery where the forger cuts out the connecting part 2, there will be visible marks because attaching the individual threads of the connecting part 2 to another information part without visible marks is, in practice, impossible.

Figure 3:
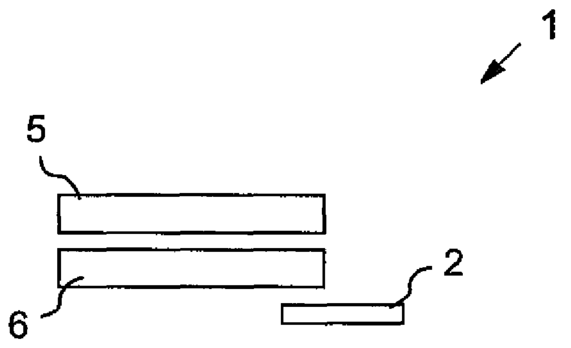
FIGS. 3 and 4 show a manufacturing method of the information page according to the invention.
Figure 4:
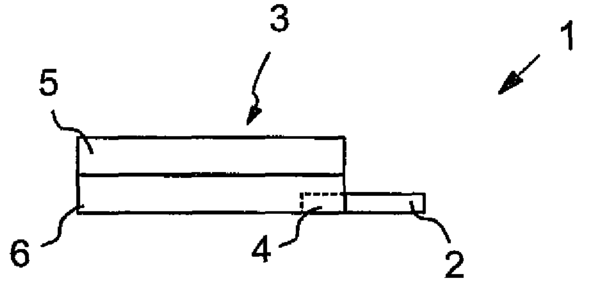

FIGS. 3 and 4 illustrate a manufacturing method of the information page according to the invention. In the embodiment of FIGS. 3 and 4 it is assumed, by way of example, that the information part 3 is manufactured to be layer-structured.

In accordance with the invention it is thinkable, however, that the information part may be manufactured to have a one-piece structure.

In FIG. 3, the parts of the information page 1 are shown separately. The information part is assembled of at least two sheets 5 and 6 laminated to each other, at least one of which is applicable to laser engraving. One sheet may thus be of non-transparent white polycarbonate, for example, and the other one of carbonized clear polycarbonate. In practice, the information part may be assembled of more than two sheets.

The connecting part 2, with which the information part 3 is attached to the security document, has a netlike structure in accordance with the invention, as described in context with FIG. 2. One alternative is to use a polyester network which has about 15 threads/cm and the thickness of which is about 300 μm. The bending property and bending strength of such a network have proven suitable for the information page of a passport, for example. To make the bending properties as good as possible, the threads of the network are preferably arranged to form an angle of 45° with the seam between the information part and the connecting part, as illustrated in FIG. 2. It is to be noted that the angle may be anything between 0° and 45°. However, it has turned out that when the connecting part having a netlike structure is bent very many times, small parts of the network threads begin to break, whereby individual broken filaments appear at the bending point. It has turned out that this phenomenon is slowest when the above-mentioned angle is 45°.

In the embodiments of FIGS. 3 and 4, the connecting part is positioned against the lower surface of the information part 3 (photograph and personal data being arranged on the upper surface in this example). In accordance with the invention, it is not necessary to form a separate notch for the connecting part 2 on the surface of that sheet 6 against which the connecting part is positioned. Having been positioned against each other in the way shown by FIG. 3, the parts 2, 5 and 6 are attached to each other by laminating. Thus, the parts 5 and 6 of the information part and the connecting part 2 are pressed against each other at a raised temperature. As a result of laminating, the part of the connecting part 2 having a netlike structure sinks into the material of the sheet 6 in the area of the seam 4, as shown in FIG. 4. The final result is an information sheet according to FIG. 2 in which the connecting part 2 protrudes from the information part 3 in the immediate vicinity of its lower surface. The openings in the netlike structure of the connecting part 2 have thus been filled with the material of the sheet 6, i.e. with polycarbonate in this example. If the netlike structure of the connecting part comprises multi-filament threads, also the spaces between the filaments are filled with polycarbonate.

The part of the connecting part 2 sinking into the information part 3 may, in accordance with the invention, sink into the information part in its entirety in such a way that the netlike structure of the connecting part 2 cannot be seen on the lower surface of the information part. Alternatively, a small part of the netlike structure may be visible on the lower surface of the information part 3. This makes attempted forgery even more difficult because now the possible points of discontinuity in individual threads of the connecting part 2 can easily be detected by examining the lower surface of the information page 1.

In the examples associated with the figures it is illustrated, by way of example, that the connecting part is of polyester and the information part is of polycarbonate. These materials provide the advantage that pressing and sinking a polyester network into polycarbonate at a raised temperature can be carried out without a significant change in the shape of the polyester network. This is because polyester has a higher melting point than polycarbonate, and the temperature used in laminating can thus be selected taking this aspect into consideration. However, if it is not desirable to preserve the network structure in the area of the seam 4, the material of the connecting part 2 can, in accordance with the invention, be selected to be a material with the same melting point as or even a lower melting point than the material of the information part. The same result, in other words the network structure not being preserved in the area of the seam 4, can also be achieved with the above-mentioned combination of materials if the laminating temperature is set sufficiently high, whereby some melting takes place in the material of both the information part and the connecting part during laminating.

It is to be understood that the above description and the related figures are only intended to illustrate the present invention. Different variations and modifications of the invention will be obvious to a person skilled in the art without there being any deviation from the scope of the invention.

The invention claimed is:

1. An information page of a security document, comprising:

an information part, on the upper or lower surface of which at least a part of the information recorded on the information page can be seen; and a flexible connecting part with good bending strength for attaching the information page to a security document, said connecting part having a netlike structure, and being arranged to penetrate into the information part in the immediate vicinity of the upper or lower surface of the information part such that the netlike structure of the connecting part sinks into the material of the information part.

2. The information page according to claim 1, wherein the netlike structure of the connecting part partly protrudes from said upper or lower surface of the information part, into the immediate vicinity of which the connecting part penetrates.

3. The information page according to claim 1, wherein the netlike structure of the connecting part comprises threads that form an angle of about 45° with a seam of the information part and the connecting part.

4. The information page according to claim 1, wherein the connecting part comprises polyester; and material of the information part coming into contact with the connecting part comprises polycarbonate.

5. A method of manufacturing an information page of a security document, comprising:

forming an information part, on the upper or lower surface of which at least part of the information recorded on the information page can be seen, attaching a flexible connecting part with good bending strength to the information part to attach the information page to the security document, selecting as the connecting part a connecting part having a netlike structure that is arranged against the upper or lower surface of the information part; and performing said attaching by laminating in such a way that at a raised temperature the connecting part is pressed against said upper or lower surface of the information part such that the netlike structure of the connecting part sinks into the material of the information part to achieve such an information page in which the connecting part penetrates into the information part in an immediate vicinity of the upper or lower surface of the information part.

6. The method according to claim 5, wherein the method further comprises:

forming the information part by positioning at least two sheets, which are to be laminated to each other, one upon the other, at least one of the sheets being applicable to laser engraving;

arranging the connecting part having a netlike structure to at least partly overlap with the sheets to be laminated to each other; and performing said laminating to attach said sheets to be laminated to each other and said connecting part together at one laminating stage.

7. The method according to claim 5, wherein the method further comprises manufacturing said selected connecting part in such a way that the netlike structure of the connecting part comprises threads that form an angle of about 45° with a seam between the information part and the connecting part.

8. The method according to claim 5, wherein the method further comprises making the information part of polycarbonate, and making the connecting part of polyester.

* * * * *